(12) United States Patent
Gu et al.

(10) Patent No.: US 11,099,567 B2
(45) Date of Patent: Aug. 24, 2021

(54) METHOD AND APPARATUS FOR EXPORTING DRIVING PROPERTY INDEX OF AUTONOMOUS VEHICLE

(71) Applicant: Baidu Online Network Technology (Beijing) Co., Ltd., Beijing (CN)

(72) Inventors: Mingqin Gu, Beijing (CN); Zhixin Zhang, Beijing (CN); Wenda Zeng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 194 days.

(21) Appl. No.: 16/049,374

(22) Filed: Jul. 30, 2018

(65) Prior Publication Data

US 2019/0086926 A1 Mar. 21, 2019

(30) Foreign Application Priority Data

Sep. 18, 2017 (CN) .......................... 201710841981.6

(51) Int. Cl.
*G05D 1/02* (2020.01)
*B62D 15/02* (2006.01)
*G01C 21/36* (2006.01)

(52) U.S. Cl.
CPC ......... *G05D 1/0212* (2013.01); *B62D 15/025* (2013.01); *G01C 21/36* (2013.01)

(58) Field of Classification Search
CPC .... G05D 1/0212; B62D 15/025; G01C 21/36; B60W 40/10; G06F 30/15; G06F 30/20
USPC ......................................................... 701/25
See application file for complete search history.

(56) References Cited

U.S. PATENT DOCUMENTS

2017/0132334 A1* 5/2017 Levinson ............. G05D 1/0214
2017/0185089 A1* 6/2017 Mei ....................... G05D 1/0088
2017/0334450 A1* 11/2017 Shiraishi ................. H04L 67/12

OTHER PUBLICATIONS

"Road Test for Dynamic and Economy Performance of Hybrid Electric Vehicle," Feng Qishan et al.; Chinese Journal of Mechanical Engineering, vol. 41, No. 12, Dec. 2005; with English abstract (7 pages).
Ren, Q., "Compilation of National Automobile Standards, vol. 1," China Standard Press, 1999.
Zhang, Q., "Automotive performance and testing," Car Performance and Testing [First Edition], China Railway Press, 2012.

* cited by examiner

*Primary Examiner* — Maceeh Anwari
(74) *Attorney, Agent, or Firm* — Nixon Peabody LLP (57) ABSTRACT

Embodiments of the present disclosure disclose a method and apparatus for exporting a driving property index of an autonomous vehicle. A specific implementation of the method comprises: constructing a driving scenario of an autonomous vehicle by using a preset driving parameter; acquiring a driving state information set of the autonomous vehicle under the driving scenario; fitting a driving curve by using the driving state information set; and acquiring and exporting a driving property index of the autonomous vehicle by analyzing the driving curve. The implementation improves the accuracy of the acquired driving property index of the autonomous vehicle, controls the autonomous vehicle on the basis of the driving property index of high accuracy, and is helpful to realize safe driving of the autonomous vehicle.

10 Claims, 5 Drawing Sheets

METHOD AND APPARATUS FOR EXPORTING DRIVING PROPERTY INDEX OF AUTONOMOUS VEHICLE

CROSS-REFERENCE TO RELATED APPLICATIONS

This application claims priority to Chinese Patent Application No. 201710841981.6, filed with the State Intellectual Property Office of the People's Republic of China (SIPO) on Sep. 18, 2017, the content of which is incorporated herein by reference in its entirety.

TECHNICAL FIELD

The present disclosure relates to the technical field of computers, specifically to the technical field of autonomous driving, and more particularly to a method and apparatus for exporting a driving property index of an autonomous vehicle.

BACKGROUND

An autonomous vehicle is a new type of intelligent vehicle, which mainly uses a control device (i.e., a vehicle-mounted intelligent controller) to accurately control, algorithmically analyze all parts of the vehicle, and finally uses an electronic control unit (ECU) to send instructions to respectively control the different devices in the autonomous vehicle, to realize an full-automatic operation of the vehicle, and to reach the goal of autonomous driving for the vehicle.

To realize autonomous driving, the vehicle needs to acquire the driving property index of the autonomous vehicle in advance and control the autonomous vehicle on the basis of the property index of the autonomous vehicle. Currently, to realize safe driving of the autonomous vehicle, how to acquire a driving property index of high accuracy becomes an acute problem to be solved.

SUMMARY

The object of embodiments of the present disclosure is to provide an improved method and apparatus for exporting a driving property index of an autonomous vehicle to solve the technical problems mentioned in the above background section.

In a first aspect, the embodiments of the present disclosure provide a method for exporting a driving property index of an autonomous vehicle, and the method includes: constructing a driving scenario of an autonomous vehicle by using a preset driving parameter; acquiring a driving state information set of the autonomous vehicle under the driving scenario; fitting a driving curve by using the driving state information set; and acquiring and exporting the driving property index of the autonomous vehicle by analyzing the driving curve.

In some embodiments, the driving property index includes at least one of a steering driving property index, an acceleration driving property index, or a deceleration driving property index.

In some embodiments, the driving property index includes the steering driving property index, the driving scenario includes a scenario with a steering angle of the autonomous vehicle changing from a first steering angle value to a second steering angle value, and the driving state information set includes driving state information of the autonomous vehicle collected at intervals of every preset steering angle value under the driving scenario.

In some embodiments, the fitting a driving curve by using the driving state information set includes: for each piece of driving state information in the driving state information set, generating a coordinate corresponding to the driving state information by taking a steering angle value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of a steering time curve, a steering angular velocity curve, or a torque curve; and the steering driving property index includes at least one of a steering response time delay, a steering duration, a steering overshoot, a steering overshoot time, an average angular velocity, a maximum angular velocity, or a maximum torque.

In some embodiments, the driving property index includes the acceleration driving property index, the driving scenario includes a scenario with an accelerator pedal opening of the autonomous vehicle changing from a first accelerator pedal opening value to a second accelerator pedal opening value, and the driving state information set includes driving state information of the autonomous vehicle collected at intervals of every preset accelerator pedal opening value under the driving scenario.

In some embodiments, the fitting a driving curve by using the driving state information set includes: for each piece of driving state information in the driving state information set, generating a coordinate corresponding to the driving state information by taking an accelerator pedal opening value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of an acceleration time curve, an acceleration distance curve, a velocity curve, or an acceleration curve; and the acceleration driving property index includes at least one of an accelerator pedal response time delay, an acceleration response time delay, an acceleration duration, an average velocity, an average acceleration, a maximum velocity, or a maximum acceleration.

In some embodiments, the driving property index includes a deceleration driving property index, the driving scenario includes a scenario with a brake pedal opening of the autonomous vehicle changing from a first brake pedal opening value to a second brake pedal opening value, and the driving state information set includes driving state information of the autonomous vehicle collected at intervals of every preset brake pedal opening value under the driving scenario.

In some embodiments, the fitting a driving curve by using the driving state information set includes: for each piece of driving state information in the driving state information set, generating a coordinate corresponding to the driving state information by taking a brake pedal opening value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of a deceleration time curve, a deceleration distance curve, a velocity curve, or a deceleration curve; and the deceleration driving property index includes at least one of a brake pedal response time delay, a deceleration response time delay, a deceleration duration, an average velocity, an average deceleration, a maximum velocity, or a maximum deceleration.

In a second aspect, the embodiments of the present disclosure provide an apparatus for exporting a driving property index of an autonomous vehicle, and the apparatus includes: a constructing unit, for constructing a driving scenario of an autonomous vehicle by using a preset driving parameter; an acquiring unit, for acquiring a driving state information set of the autonomous vehicle under the driving scenario; a fitting unit, for fitting a driving curve by using the driving state information set; and an exporting unit, for acquiring and exporting the driving property index of the autonomous vehicle by analyzing the driving curve.

In some embodiments, the driving property index includes at least one of a steering driving property index, an acceleration driving property index, or a deceleration driving property index.

In some embodiments, the driving property index includes the steering driving property index, the driving scenario includes a scenario with a steering angle of the autonomous vehicle changing from a first steering angle value to a second steering angle value, and the driving state information set includes driving state information of the autonomous vehicle collected at intervals of every preset steering angle value under the driving scenario.

In some embodiments, the fitting unit is further configured for: for each piece of driving state information in the driving state information set, generating a coordinate corresponding to the driving state information by taking a steering angle value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of a steering time curve, a steering angular velocity curve, or a torque curve; and the steering driving property index includes at least one of a steering response time delay, a steering duration, a steering overshoot, a steering overshoot time, an average angular velocity, a maximum angular velocity, or a maximum torque.

In some embodiments, the driving property index includes the acceleration driving property index, the driving scenario includes a scenario with an accelerator pedal opening of the autonomous vehicle changing from a first accelerator pedal opening value to a second accelerator pedal opening value, and the driving state information set includes driving state information of the autonomous vehicle collected at intervals of every preset accelerator pedal opening value under the driving scenario.

In some embodiments, the fitting unit is further configured for: for each piece of driving state information in the driving state information set, generating a coordinate corresponding to the driving state information by taking an accelerator pedal opening value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of an acceleration time curve, an acceleration distance curve, a velocity curve, or an acceleration curve; and the acceleration driving property index includes at least one of an accelerator pedal response time delay, an acceleration response time delay, an acceleration duration, an average velocity, an average acceleration, a maximum velocity, or a maximum acceleration.

In some embodiments, the driving property index includes a deceleration driving property index, the driving scenario includes a scenario with a brake pedal opening of the autonomous vehicle changing from a first brake pedal opening value to a second brake pedal opening value, and the driving state information set includes driving state information of the autonomous vehicle collected at intervals of every preset brake pedal opening value under the driving scenario.

In some embodiments, the fitting unit is further configured for: for each piece of driving state information in the driving state information set, generating a coordinate corresponding to the driving state information by taking a brake pedal opening value corresponding to the driving state information as a first coordinate value and taking the driving state information as a second coordinate value; and fitting, through a curve fitting method, a driving curve by using points indicated by coordinates corresponding to each piece of driving state information in the driving state information set.

In some embodiments, the driving curve includes at least one of a deceleration time curve, a deceleration distance curve, a velocity curve, or a deceleration curve; and the deceleration driving property index includes at least one of a brake pedal response time delay, a deceleration response time delay, a deceleration duration, an average velocity, an average deceleration, a maximum velocity, or a maximum deceleration.

In a third aspect, the embodiments of the present application provide a server including: one or more processors, and a storage device for storing one or more programs, wherein when the one or more programs are executed by the one or more processors, the one or more processors implement the method described in any implementation in the first aspect.

In a fourth aspect, the embodiments of the present disclosure provide a computer readable storage medium on which computer programs are stored, and when the computer programs are executed by the processors, the method as described in any implementation in the first aspect is implemented.

The method and apparatus for exporting a driving property index of an autonomous vehicle, provided by the embodiments of the present disclosure, first, construct a driving scenario of the autonomous vehicle by using a preset driving parameter to acquire a driving state information set of the autonomous vehicle under the driving scenario; then, fit a driving curve by using the driving state information set; and finally, analyze the driving curve to acquire and export a driving property index of the autonomous vehicle. The implementation improves the accuracy of the acquired driving property index of the autonomous vehicle, controls the autonomous vehicle on the basis of the driving property index of high accuracy, and is helpful to realize safe driving of the autonomous vehicle.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
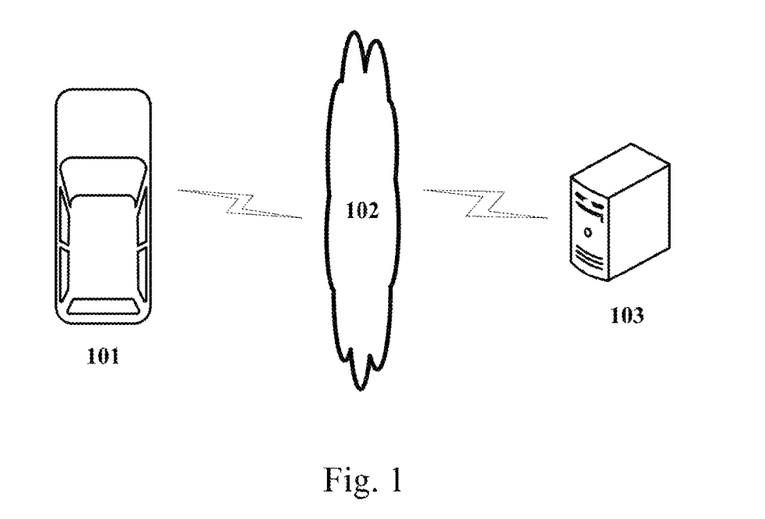
FIG. 1 is an architectural diagram of an exemplary system in which the embodiments of the present disclosure can be applied.

FIG. 1 shows an exemplary system architecture 100 to which the method and apparatus for exporting a driving property index of an autonomous vehicle according to the embodiments of the present disclosure can be applied.

As shown in FIG. 1, the system architecture 100 may include an autonomous vehicle 101, a network 102 and a server 103. The network 102 is used for providing a communication link medium between the autonomous vehicle 101 and the server 103. The network 102 may include various connection types, such as wired and wireless communication links, optical fiber.

The server 103 may be a server that provides various services. For example, the server 103 may be a background management server of the autonomous vehicle 101, and the background management server may acquire a driving state information set of the autonomous vehicle 101 under various driving scenarios, analyze the driving state information set, and export a processing result (e.g., a traveling property index of the autonomous vehicle 101).

It should be noted that the method for exporting a driving property index of an autonomous vehicle, provided by the embodiments of the present disclosure, is generally executed by the server 103, and accordingly, the apparatus for exporting a driving property index of an autonomous vehicle is generally arranged in the server 103.

It should be appreciated that the numbers of the autonomous vehicle, the network, and the server in FIG. 1 are only illustrative. Any number of terminal devices, networks and servers may be provided based on the actual requirements.

Figure 2:
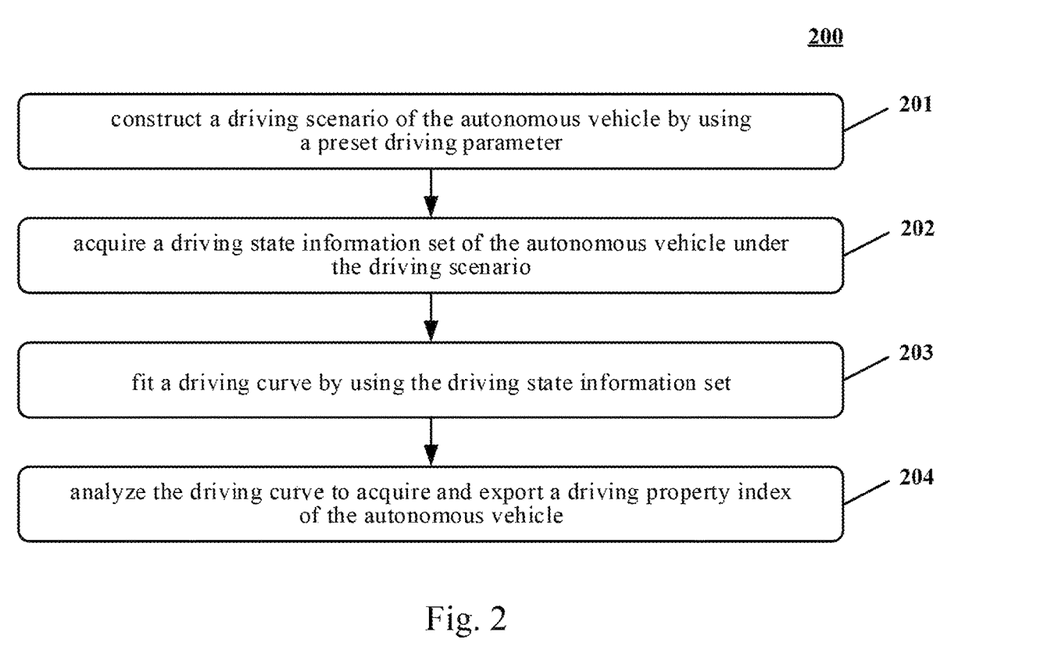
FIG. 2 shows a flow chart of the method for exporting a driving property index of an autonomous vehicle according to an embodiment of the present disclosure.

Continue to refer to FIG. 2, it shows a flow 200 of the method for exporting a driving property index of an autonomous vehicle according to an embodiment of the present disclosure. The method for exporting a driving property index of an autonomous vehicle includes:

Step 201, constructing a driving scenario of the autonomous vehicle by using a preset driving parameter.

In the present embodiment, an electronic device (e.g., the server 103 shown in FIG. 1) on which the method for exporting a driving property index of an autonomous vehicle runs can construct a driving scenario of the autonomous vehicle (e.g., the autonomous vehicle 101 shown in FIG. 1) by using a preset driving parameter. The driving parameter may include, but not limited to, initial location information, final location information, initial driving state information, final driving state information of the autonomous vehicle. The driving state information may include, but not limited to, a velocity, a driving direction, a driving time, an acceleration, a deceleration of the autonomous vehicle. The driving scenario can be described by using the driving parameter, and characterizes a scenario related to the driving of the autonomous vehicle. For example, the driving scenario may include a scenario in which the autonomous vehicle changes from one driving state to another driving state. The driving scenario may include, but not limited to, a steering driving scenario, an acceleration driving scenario, a deceleration driving scenario. Specifically, the steering driving scenario may be a scenario characterizing the autonomous vehicle changing from one steering angle to another steering angle. The acceleration driving scenario may be a scenario characterizing the autonomous vehicle changing from one acceleration to another acceleration. The deceleration driving scenario may be a scenario characterizing the autonomous vehicle changing from one deceleration to another deceleration.

Step 202, acquiring a driving state information set of the autonomous vehicle under the driving scenario.

In the present embodiment, the electronic device can acquire a driving state information set of the autonomous vehicle under the driving scenario on the basis of the driving scenario constructed in step 201. Specifically, a sensor mounted on the autonomous vehicle can collect the driving state information set of the autonomous vehicle under the driving scenario and send the collected driving state information set to the electronic device. The driving state information set may include a plurality of pieces of travel state information of the autonomous vehicle under the driving scenario. As an example, the sensor of the autonomous vehicle can collect driving state information of the autonomous vehicle at intervals of a preset time interval (for example, a time interval of 1 second).

Step 203, fitting a driving curve by using the driving state information set.

In the present embodiment, the electronic device can fit a driving curve by using the driving state information set on the basis of the driving state information set acquired in step 202. Specifically, the electronic device can first set a coordinate system, for example, using one type of driving state information as the horizontal ordinate and the other type of driving state information as the vertical ordinate, then map each piece of driving state information in the driving state information set as a corresponding coordinate in the coordinate system, and finally, using a continuous curve to approximately depict or match the points indicated by the coordinates in the coordinate system. In general, the weighted sum of squares of distances from the points indicated by the coordinates corresponding to each piece of driving state information in the driving state information set to the fitted driving curve is the smallest.

In the present embodiment, for a same type of driving state information sets of a same type of autonomous vehicles, the electronic device can fit a driving curve by using the driving state information set. For a same type of driving state information sets of different types of autonomous vehicles, the electronic device can fit a plurality of driving curves by using the driving state information sets of various types of autonomous vehicles, where one driving curve corresponds to one type of autonomous vehicle.

Step 204, acquiring and exporting a driving property index of the autonomous vehicle by analyzing the driving curve.

In the present embodiment, the electronic device can analyze the driving curve to acquire and export a driving property index of the autonomous vehicle on the basis of the driving curve fitted in step 203. An identical driving curve can be used to describe a change law of driving state information of the same type of autonomous vehicles. Different driving curves can be used to describe differences between driving state information of different types of autonomous vehicles.

In the present embodiment, for the same type of autonomous vehicles, the driving property index may include certain specific driving state information of the autonomous vehicles under the driving scenario. As an example, in the case of the driving curve including a velocity-time driving curve, the electronic device can acquire at least one of the following specific driving state information from the driving curve: a time when the autonomous vehicle reaches the maximum velocity, a time when the autonomous vehicle reaches the minimum velocity, the maximum velocity of the autonomous vehicle, the minimum velocity of the autonomous vehicle, a time taken for the autonomous vehicle to reach a second velocity from a first velocity, or a distance traveled by the autonomous vehicle from the first velocity to the second velocity.

In the present embodiment, for different types of autonomous vehicles, the driving property index may include differences between the driving state information of different types of autonomous vehicles. As an example, in the case of the driving curve including a velocity-time driving curve, the electronic device can acquire at least one of the following from driving curves of different types of autonomous vehicles: a time difference when the different types of autonomous vehicles reach maximum velocities, a time difference when the different types of autonomous vehicles reach minimum velocities, a maximum velocity difference of the different types of autonomous vehicles, a minimum velocity difference of the different types of autonomous vehicles, a time difference taken by the different types of autonomous vehicles to reach a second velocity from a first velocity, or a distance difference of the different types of autonomous vehicles traveled from the first velocity to the second velocity.

In some optional implementations of the present embodiment, the driving property index may include, but not limited to, at least one of the following: a steering driving property index, an acceleration driving property index, or a deceleration driving property index. The steering driving property index may include certain specific driving state information of the autonomous vehicle under a steering driving scenario. The acceleration driving property index may include certain specific driving state information of the autonomous vehicle under an acceleration driving scenario. The deceleration driving property index may include certain specific driving state information of the autonomous vehicle under a deceleration driving scenario.

The method for exporting a driving property index of an autonomous vehicle, provided by the embodiments of the present disclosure, includes: first, constructing a driving scenario of the autonomous vehicle by using a preset driving parameter to acquire a driving state information set of the autonomous vehicle under the driving scenario; then, fitting a driving curve using the driving state information set; and finally, analyzing the driving curve to acquire and export a driving property index of the autonomous vehicle. The implementation improves the accuracy of the acquired driving property index of the autonomous vehicle, controls the autonomous vehicle on the basis of the driving property index of high accuracy, and is helpful to realize safe driving of the autonomous vehicle.

Figure 3:
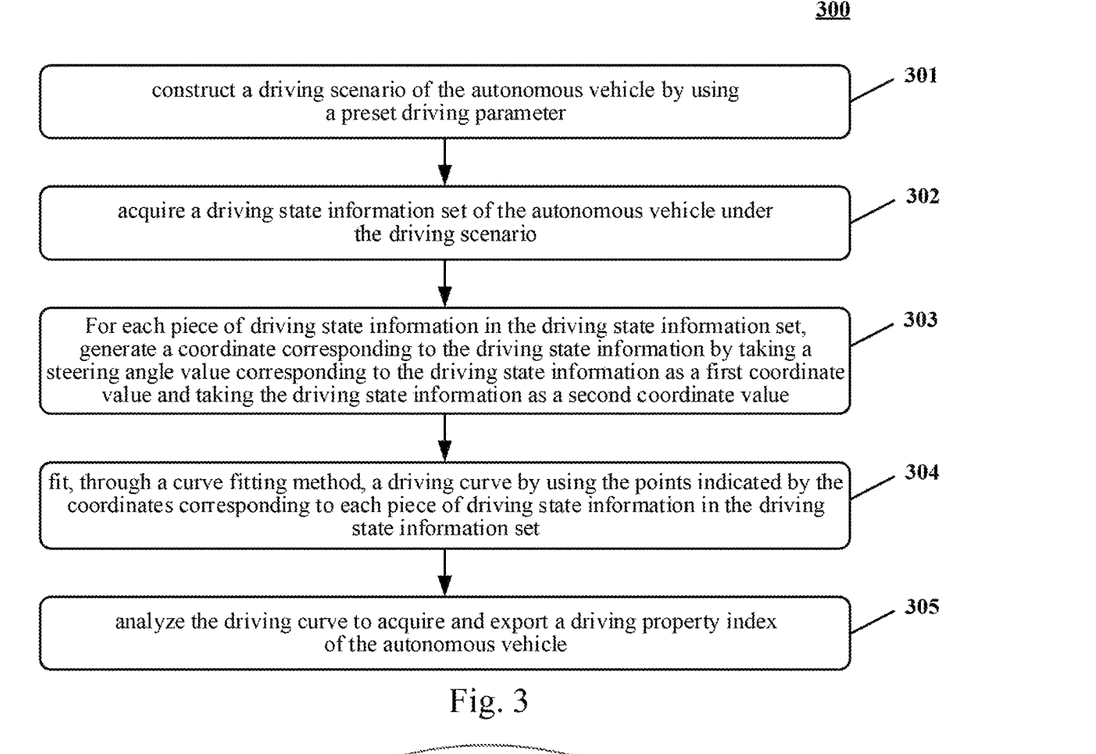
FIG. 3 is a flow chart of the method for exporting a driving property index of an autonomous vehicle according to another embodiment of the present disclosure.

Further refer to FIG. 3, it shows a flow 300 of the method for exporting a driving property index of an autonomous vehicle according to another embodiment of the present disclosure. The method for exporting a driving property index of an autonomous vehicle includes:

Step 301, constructing a driving scenario of the autonomous vehicle by using a preset driving parameter.

In the present embodiment, an electronic device (e.g., the server 103 shown in FIG. 1) on which the method for exporting a driving property index of an autonomous vehicle runs can construct a driving scenario of the autonomous vehicle (e.g., the autonomous vehicle 101 shown in FIG. 1) by using a preset driving parameter. The driving scenario may include a steering driving scenario. The steering driving scenario may include a scenario with a steering angle of the autonomous vehicle changing from a first steering angle value to a second steering angle value. As an example, the steering angle of the autonomous vehicle can change from −470 degrees to 470 degrees.

Step 302, acquiring a driving state information set of the autonomous vehicle under the driving scenario.

In the present embodiment, the electronic device can acquire a driving state information set of the autonomous vehicle under the driving scenario on the basis of the driving scenario constructed in step 301. Specifically, a sensor mounted on the autonomous vehicle can collect the driving state information set of the autonomous vehicle under the driving scenario and send the collected driving state information set to the electronic device. The driving state information set includes driving state information of the autonomous vehicle collected at intervals of every preset steering angle value under the driving scenario. As an example, in a process of changing the steering angle of the autonomous vehicle from −470 degrees to 470 degrees, the sensor of the autonomous vehicle collects the driving state information of the autonomous vehicle once at intervals of every 5 degrees.

Step 303, for each piece of driving state information in the driving state information set, generating a coordinate corresponding to the driving state information by taking a steering angle value corresponding to the driving state information as a first coordinate value and taking the driving state information as a second coordinate value.

In the present embodiment, on the basis of the driving state information set acquired in step 302, the electronic device can take a steering angle corresponding to each piece of driving state information in the driving state information set as a first coordinate value (e.g., a coordinate value on the horizontal ordinate) and take each piece of driving state information as a second coordinate value (e.g., a coordinate value on the vertical ordinate), thereby to generate coordinates corresponding to each piece of driving state information. As an example, the electronic device can take each steering angle as a horizontal ordinate and take a steering time, an angular velocity, a torque, or the like acquired at each steering angle as a vertical ordinate.

Step 304, fitting, through a curve fitting method, a driving curve by using points indicated by coordinates corresponding to each piece of driving state information in the driving state information set.

In the present embodiment, on the basis of the coordinates corresponding to each piece of driving state information generated in step 303, the electronic device can use continuous curves to approximately depict or match, through a curve fitting method, the points indicated by the coordinates corresponding to each piece of driving state information. In general, the weighted sum of squares of distances from the points indicated by the coordinates corresponding to each piece of driving state information in the driving state information set to the fitted driving curve is the smallest. The driving curve may include, but not limited to, at least one of the following: a steering time curve, a steering angular velocity curve, or a torque curve. A coordinate system of the steering time curve can take a steering angle as the horizontal ordinate and a steering time as the vertical ordinate. A coordinate system of the steering angular velocity curve can take a steering angle as the horizontal ordinate and a steering angular velocity as the vertical ordinate. A coordinate system of the torque curve can take a steering angle as the horizontal ordinate and a torque as the vertical ordinate.

Step 305, acquiring and exporting a driving property index of the autonomous vehicle by analyzing the driving curve.

In the present embodiment, the electronic device can analyze the driving curve to acquire and export a driving property index of the autonomous vehicle on the basis of the driving curve fitted in step 304. The driving property index may include a steering driving property index. The steering driving property index may include, but not limited to, at least one of the following: a steering response time delay, a steering duration, a steering overshoot, a steering overshoot time, an average angular velocity, a maximum angular velocity, or a maximum torque. The steering response time delay is a time difference between a time point at which the steering angle starts to change and a time point at which a steering instruction is sent. The steering duration is a time difference between a time point at which the steering angle reaches the maximum steering angle value and a time point at which a steering instruction is sent. The steering overshoot is an angle difference between an actual maximum steering angle value and a preset maximum steering angle value. The steering overshoot time is a time difference between a steering time when the autonomous vehicle reaches the actual maximum steering angle value and a steering time when the autonomous vehicle reaches the preset maximum steering angle value. The average angular velocity is a ratio of a steering angle to a steering duration of the autonomous vehicle in the whole steering driving scenario. The maximum angular velocity is the maximum vertical ordinate value on a steering angular velocity curve. The maximum torque is the maximum vertical ordinate value on a torque curve.

Figure 4:
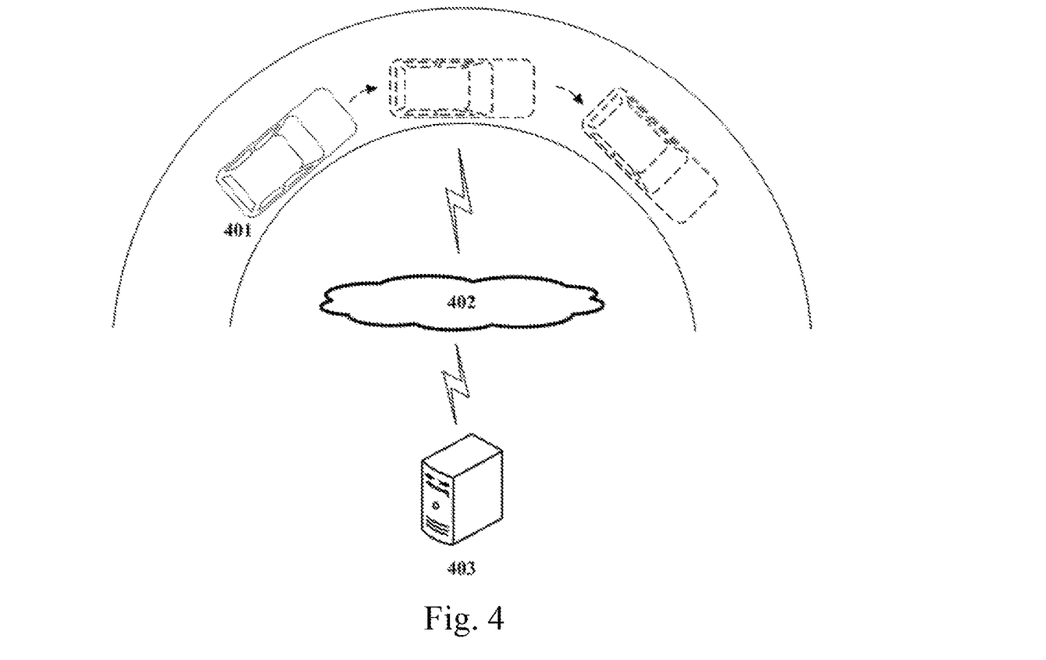
FIG. 4 is a schematic diagram of an application scenario of the method for exporting a driving property index of an autonomous vehicle in FIG. 3.

Continue to refer to FIG. 4, FIG. 4 is a schematic diagram of an application scenario of the method for exporting a driving property index of an autonomous vehicle in FIG. 3. In the application scenario of FIG. 4, first, a background management server 403 of the autonomous vehicle 401 can construct a driving scenario of the autonomous vehicle, that is, the steering angle is changed from −470 degrees to 470 degrees. Then, a sensor of the autonomous vehicle 401 can collect a steering time of the autonomous vehicle 401 once at intervals of every 5 degrees to generate a steering time set and send the steering time set to the background management server 403 through a network 402. Then, the background management server 403 can set a coordinate system by taking a steering angle as the horizontal ordinate and a steering time as the vertical ordinate, and map the steering time set to a plurality of points in the coordinate system. Then, the background management server 403 can fit a steering time curve using the plurality of points mapped by the steering time set. Finally, the background management server 403 can analyze the steering time curve to obtain steering property indexes of the autonomous vehicle 401 such as a steering delay time, a steering duration, or an average angular velocity.

It can be seen from FIG. 3 that compared with the corresponding embodiment of FIG. 2, the flow 300 of the method for exporting a driving property index of an autonomous vehicle in the present embodiment highlights steps 303 and 304. Thus, the scheme described in the present embodiment can fit a steering driving curve to obtain a steering driving property index.

Figure 5:
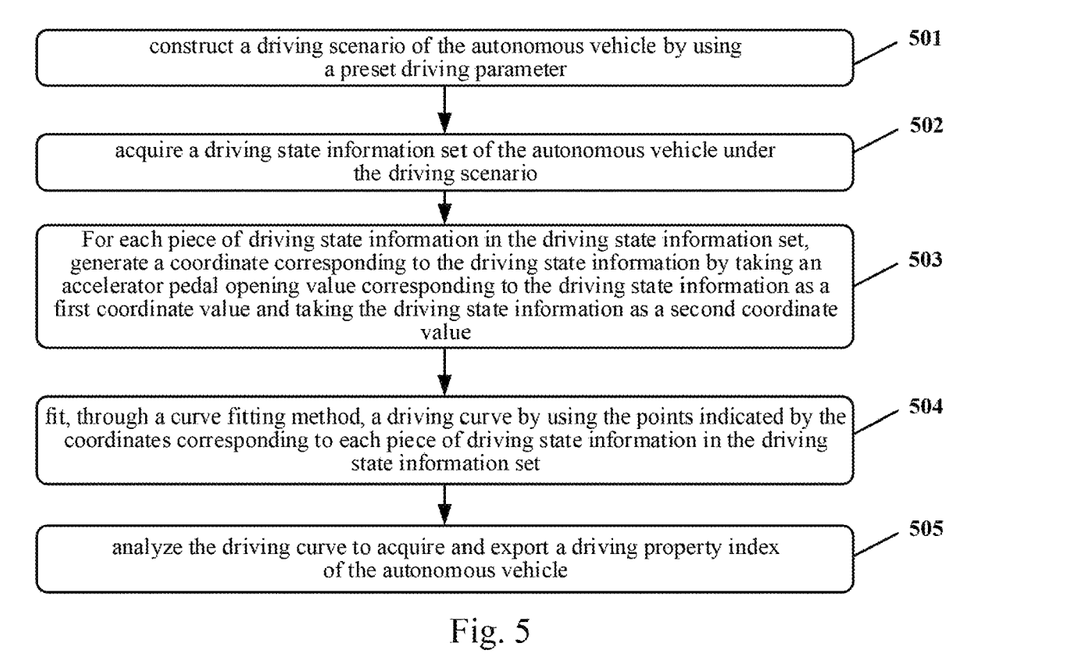
FIG. 5 is a flow chart of the method for exporting a driving property index of an autonomous vehicle according to another embodiment of the present disclosure.

Further refer to FIG. 5, it shows a flow 500 of the method for exporting a driving property index of an autonomous vehicle according to another one more embodiment of the present disclosure. The method for exporting a driving property index of an autonomous vehicle includes:

Step 501, constructing a driving scenario of the autonomous vehicle by using a preset driving parameter.

In the present embodiment, an electronic device (e.g., the server 103 shown in FIG. 1) on which the method for exporting a driving property index of an autonomous vehicle runs can construct a driving scenario of the autonomous vehicle (e.g., the autonomous vehicle 101 shown in FIG. 1) by using a preset driving parameter. The driving scenario may include an acceleration driving scenario. The acceleration driving scenario may include a scenario with an accelerator pedal opening of the autonomous vehicle changing from a first accelerator pedal opening value to a second accelerator pedal opening value. As an example, the accelerator pedal opening of the autonomous vehicle can be changed from 15% to 85%.

Step 502, acquiring a driving state information set of the autonomous vehicle under the driving scenario.

In the present embodiment, the electronic device can acquire a driving state information set of the autonomous vehicle under the driving scenario on the basis of the driving scenario constructed in step 501. Specifically, a sensor mounted on the autonomous vehicle can collect the driving state information set of the autonomous vehicle under the driving scenario and send the collected driving state information set to the electronic device. The driving state information set includes driving state information of the autonomous vehicle collected at intervals of every preset accelerator pedal opening value under the driving scenario. As an example, in a process of changing the accelerator pedal opening of the autonomous vehicle from 15% to 85%, the sensor of the autonomous vehicle collects the driving state information of the autonomous vehicle once at intervals of every 1%.

Step 503, for each piece of driving state information in the driving state information set, generating a coordinate corresponding to the driving state information by taking an accelerator pedal opening value corresponding to the driving state information as a first coordinate value and taking the driving state information as a second coordinate value.

In the present embodiment, on the basis of the driving state information set acquired in step 502, the electronic device can take an accelerator pedal opening value corresponding to each piece of driving state information in the driving state information set as a first coordinate value (e.g., a coordinate value on the horizontal ordinate) and take each piece of driving state information as a second coordinate value (e.g., a coordinate value on the vertical ordinate), thereby to generate coordinates corresponding to each piece of driving state information. As an example, the electronic device can take each accelerator pedal opening as the horizontal ordinate and take an acceleration time, a velocity, an acceleration, or the like acquired at each accelerator pedal opening as the vertical ordinate.

Step 504, fitting, through a curve fitting method, a driving curve by using points indicated by coordinates corresponding to each piece of driving state information in the driving state information set.

In the present embodiment, on the basis of the coordinates corresponding to each piece of driving state information generated in step 503, the electronic device can use continuous curves to approximately depict or match, through a curve fitting method, the points indicated by the coordinates corresponding to each piece of driving state information. In general, the weighted sum of squares of distances from points indicated by coordinates corresponding to each piece of driving state information in the driving state information set to the fitted driving curve is the smallest. The driving curve may include, but not limited to, at least one of the following: an acceleration time curve, an acceleration distance curve, a velocity curve, or an acceleration curve. A coordinate system of the acceleration time curve can take an accelerator pedal opening as the horizontal ordinate and an acceleration time as the vertical ordinate. A coordinate system of the acceleration distance curve can take an accelerator pedal opening as the horizontal ordinate and an acceleration distance as the vertical ordinate. A coordinate system of the velocity curve can take an accelerator pedal opening as the horizontal ordinate and a velocity as the vertical ordinate. A coordinate system of the acceleration curve can take an accelerator pedal opening as the horizontal ordinate and an acceleration as the vertical ordinate.

Step 505, acquiring and exporting a driving property index of the autonomous vehicle by analyzing the driving curve.

In the present embodiment, the electronic device can analyze the driving curve to acquire and export a driving property index of the autonomous vehicle on the basis of the driving curve fitted in step 504. The driving property index may include an acceleration driving property index. The acceleration driving property index may include, but not limited to, at least one of the following: an accelerator pedal response time delay, an acceleration response time delay, an acceleration duration, an average velocity, an average acceleration, a maximum velocity, or a maximum acceleration. The accelerator pedal response time delay is a time difference between a time point at which the acceleration starts to change and a time point at which an acceleration instruction is sent. The acceleration response time delay is a time difference between a time point at which the velocity starts to change and a time point at which an acceleration instruction is sent. The acceleration duration is a time difference between a time point at which the acceleration reaches the maximum acceleration value and a time point at which a steering instruction is sent. The average velocity is a ratio of a velocity of the autonomous vehicle to the acceleration duration in a whole acceleration driving scenario. The average acceleration is a ratio of an acceleration of the autonomous vehicle to the acceleration duration in a whole acceleration driving scenario. The maximum velocity is the maximum vertical ordinate value on a velocity curve. The maximum acceleration is the maximum vertical ordinate value on an acceleration curve.

Figure 6:
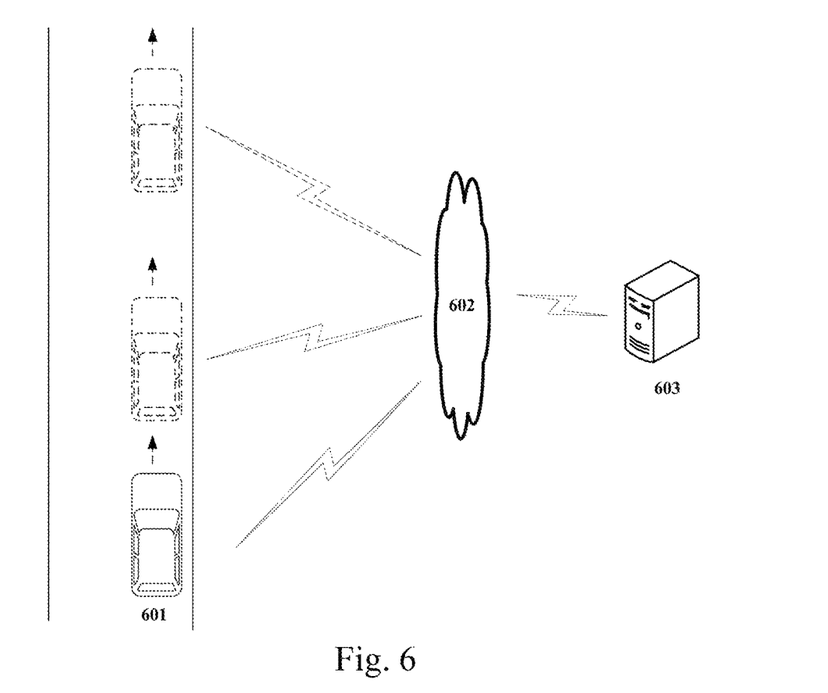
FIG. 6 is a schematic diagram of an application scenario of the method for exporting a driving property index of an autonomous vehicle in FIG. 5.

Continue to refer to FIG. 6, FIG. 6 is a schematic diagram of an application scenario of the method for exporting a driving property index of an autonomous vehicle in FIG. 5. In the application scenario of FIG. 5, first, a background management server 603 of the autonomous vehicle 601 can construct a driving scenario of the autonomous vehicle, that is, the accelerator pedal opening is changed from 15% to 85%. Then, the sensor of the autonomous vehicle 601 can collect an acceleration of the autonomous vehicle 601 once at intervals of every 1% to generate an acceleration set and send the acceleration set to the background management server 603 through a network 602. Then, the background management server 603 can set a coordinate system by taking an accelerator pedal opening as the horizontal ordinate and the acceleration as the vertical ordinate, and map the acceleration set to a plurality of points in the coordinate system. Then, the background management server 603 can fit an acceleration curve by using the plurality of points mapped by the acceleration set. Finally, the background management server 603 can analyze the acceleration curve to obtain acceleration driving property indexes of the autonomous vehicle 601 such as an acceleration response time delay, an average acceleration, a maximum acceleration.

It can be seen from FIG. 5 that compared with the corresponding embodiment of FIG. 2, the flow 500 of the method for exporting a driving property index of an autonomous vehicle in the present embodiment highlights steps 503 and 504. Thus, the scheme described in the present embodiment can fit an acceleration driving curve to obtain an acceleration driving property index.

Figure 7:
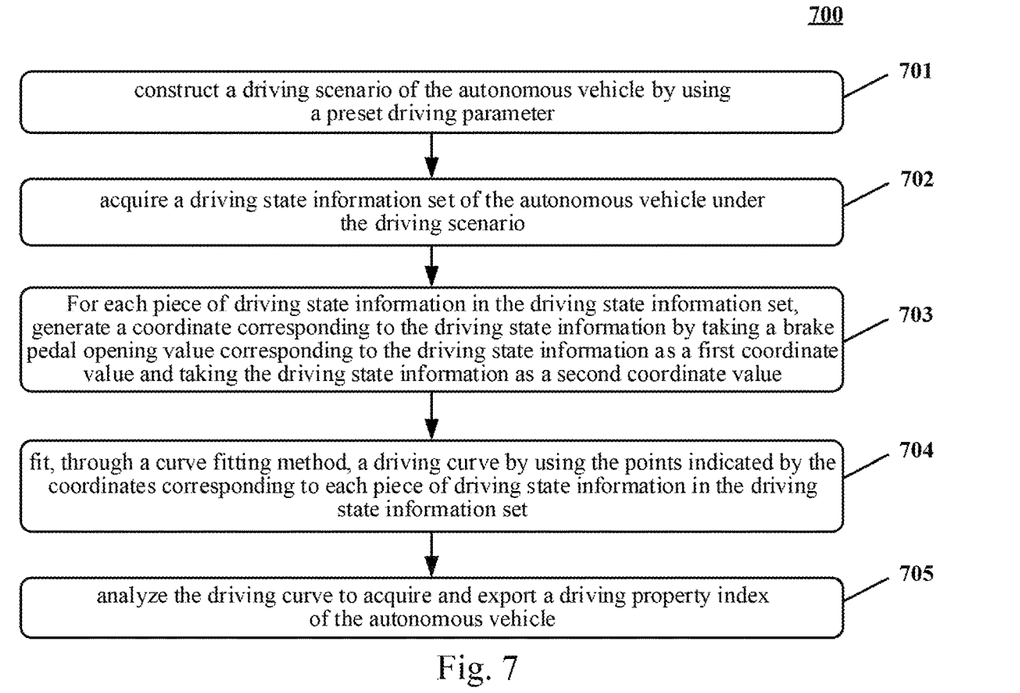
FIG. 7 is a flow chart of the method for exporting a driving property index of an autonomous vehicle according to another one more embodiment of the present disclosure.

Further referring to FIG. 7, it shows a flow 700 of the method for exporting a driving property index of an autonomous vehicle according to another one more embodiment of the present disclosure. The method for exporting a driving property index of an autonomous vehicle includes:

Step 701, constructing a driving scenario of the autonomous vehicle by using a preset driving parameter.

In the present embodiment, an electronic device (e.g., the server 103 shown in FIG. 1) on which the method for exporting a driving property index of an autonomous vehicle runs can construct a driving scenario of the autonomous vehicle (e.g., the autonomous vehicle 101 shown in FIG. 1) by using a preset driving parameter. The driving scenario may include a deceleration driving scenario. The deceleration driving scenario may include a scenario with a brake pedal opening of the autonomous vehicle changing from a first brake pedal opening value to a second brake pedal opening value. As an example, the brake pedal opening of the autonomous vehicle can be changed from 21% to 35%.

Step 702, acquiring a driving state information set of the autonomous vehicle under the driving scenario.

In the present embodiment, the electronic device can acquire a driving state information set of the autonomous vehicle under the driving scenario on the basis of the driving scenario constructed in step 701. Specifically, a sensor mounted on the autonomous vehicle can collect the driving state information set of the autonomous vehicle under the driving scenario and send the collected driving state information set to the electronic device. The driving state information set includes driving state information of the autonomous vehicle collected at intervals of every preset brake pedal opening value under the driving scenario. As an example, in a process of changing the brake pedal opening of the autonomous vehicle from 21% to 35%, the sensor of the autonomous vehicle collects the driving state information of the autonomous vehicle once at intervals of every 1%.

Step 703, for each piece of driving state information in the driving state information set, generating a coordinate corresponding to the driving state information by taking a brake pedal opening value corresponding to the driving state information as a first coordinate value and taking the driving state information as a second coordinate value.

In the present embodiment, on the basis of the driving state information set acquired in step 702, the electronic device can take a brake pedal opening value corresponding to each piece of driving state information in the driving state information set as a first coordinate value (e.g., a coordinate value on the horizontal ordinate) and take each piece of driving state information as a second coordinate value (e.g., a coordinate value on the vertical ordinate), thereby to generate a coordinate corresponding to each piece of driving state information. As an example, the electronic device can take each brake pedal opening as the horizontal ordinate and take a deceleration time, a velocity, a deceleration, or the like acquired at each brake pedal opening as the vertical ordinate.

Step 704, fitting, through a curve fitting method, a driving curve by using points indicated by coordinates corresponding to each piece of driving state information in the driving state information set.

In the present embodiment, on the basis of the coordinates corresponding to each piece of driving state information generated in step 703, the electronic device can use continuous curves to approximately depict or match, through a curve fitting method, the points indicated by the coordinates corresponding to each piece of driving state information. In general, the weighted sum of squares of distances from points indicated by coordinates corresponding to each piece of driving state information in the driving state information set to the fitted driving curve is the smallest. The driving curve may include, but is not limited to, at least one of the following: a deceleration time curve, a deceleration distance curve, a velocity curve, or a deceleration curve. A coordinate system of the deceleration time curve can take a brake pedal opening as the horizontal ordinate and a deceleration time as the vertical ordinate. A coordinate system of the deceleration distance curve can take a brake pedal opening as the horizontal ordinate and a deceleration distance as the vertical ordinate. A coordinate system of the velocity curve can take a brake pedal opening as the horizontal ordinate and a velocity as the vertical ordinate. A coordinate system of the deceleration curve can take a brake pedal opening as the horizontal ordinate and a deceleration as a the vertical ordinate.

Step 705, acquiring and exporting a driving property index of the autonomous vehicle by analyzing the driving curve.

In the present embodiment, the electronic device can analyze the driving curve to acquire and export a driving property index of the autonomous vehicle on the basis of the driving curve fitted in step 704. The driving property index may include a deceleration driving property index. The deceleration driving property index may include, but not limited to, at least one of the following: a brake pedal response time delay, a deceleration response time delay, a deceleration duration, an average velocity, an average deceleration, a maximum velocity, or a maximum deceleration. The brake pedal response time delay is a time difference between a time point at which the deceleration starts to change and a time point at which a deceleration instruction is sent. The deceleration response time delay is a time difference between a time point at which the velocity starts to change and a time point at which a deceleration instruction is sent. The deceleration duration is a time difference between a time point at which the deceleration reaches the maximum deceleration value and a time point at which a deceleration instruction is sent. The average velocity is a ratio of a velocity of the autonomous vehicle to the deceleration duration in a whole deceleration driving scenario. The average deceleration is a ratio of a deceleration of the autonomous vehicle to the deceleration duration in a whole deceleration driving scenario. The maximum velocity is the maximum vertical ordinate value on a velocity curve. The maximum deceleration is the maximum vertical ordinate value on a deceleration curve.

Figure 8:
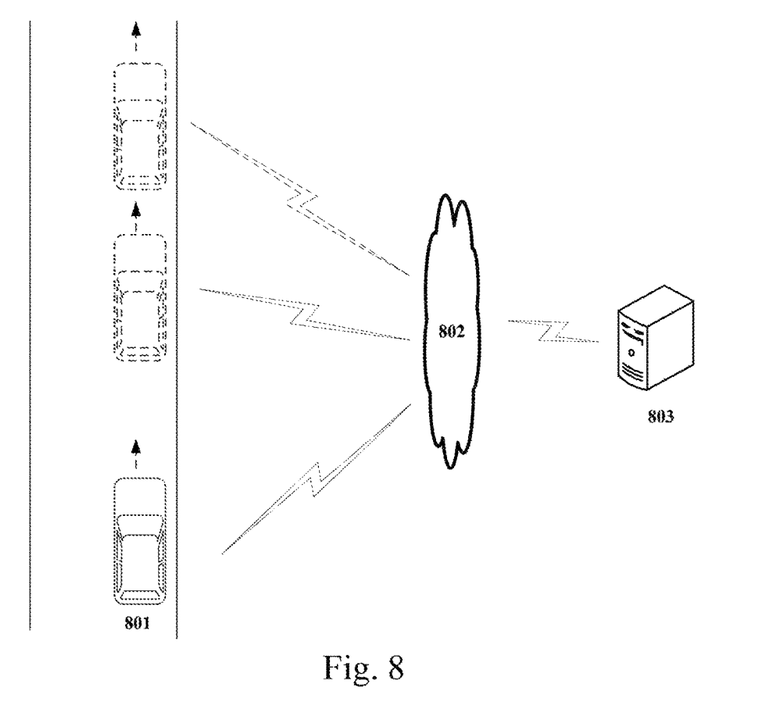
FIG. 8 is a schematic diagram of an application scenario of the method for exporting a driving property index of an autonomous vehicle in FIG. 7.

Continue to refer to FIG. 8, FIG. 8 is a schematic diagram of an application scenario of the method for exporting a driving property index of an autonomous vehicle in FIG. 7. In the application scenario of FIG. 8, first, a background management server 803 of the autonomous vehicle 801 can construct a driving scenario of the autonomous vehicle, that is, the brake pedal opening is changed from 21% to 35%. Then, the sensor of the autonomous vehicle 801 can collect a deceleration of the autonomous vehicle 801 once at intervals of every 1% to generate a deceleration set and send the deceleration set to the background management server 803 through a network 802. Then, the background management server 803 can set a coordinate system by taking a brake pedal opening as the horizontal ordinate and the deceleration as the vertical ordinate, and map the deceleration set to a plurality of points in the coordinate system. Then, the background management server 803 can fit a deceleration curve by using the plurality of points mapped by the deceleration set. Finally, the background management server 803 can analyze the deceleration curve to obtain deceleration driving property indexes of the autonomous vehicle 801 such as a deceleration response time delay, an average deceleration, a maximum deceleration and the like.

It can be seen from FIG. 7 that compared with the corresponding embodiment of FIG. 2, the flow 700 of the method for exporting a driving property index of an autonomous vehicle in the present embodiment highlights steps 703 and 704. Thus, the scheme described in the present embodiment can fit a deceleration driving curve to obtain a deceleration driving property index.

Figure 9:
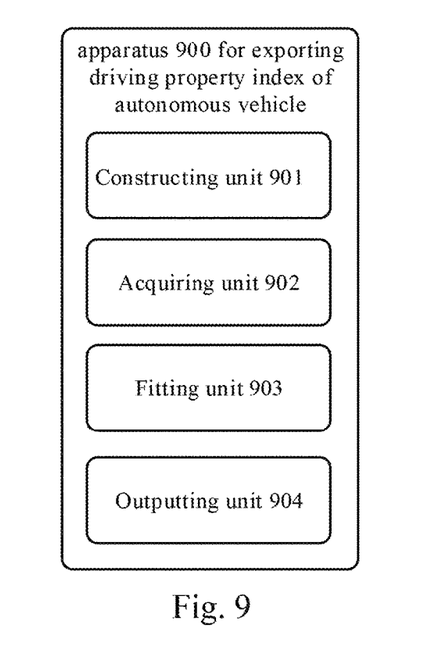
FIG. 9 is a structural diagram of the apparatus for exporting a driving property index of an autonomous vehicle according to an embodiment of the present disclosure.

Further referring to FIG. 9, as the implementation of the method shown in the above figures, the present disclosure provides an embodiment of an apparatus for exporting a driving property index of an autonomous vehicle, the embodiment of the apparatus corresponds to the embodiment of the method shown in FIG. 2, and the apparatus can be specifically applied in various types of electronic devices.

As shown in FIG. 9, the apparatus 900 for exporting a driving property index of an autonomous vehicle shown in the present embodiment includes: a constructing unit 901, an acquiring unit 902, a fitting unit 903, and an exporting unit 904. The constructing unit 901 is configured for constructing a driving scenario of an autonomous vehicle by using a preset driving parameter; the acquiring unit 902 is configured for acquiring a driving state information set of the autonomous vehicle under the driving scenario; the fitting unit 903 is configured for fitting a driving curve by using the driving state information set; and the exporting unit 904 is configured for acquiring and exporting the driving property index of the autonomous vehicle by analyzing the driving curve.

In the present embodiment, the specific processing of the constructing unit 901, the acquiring unit 902, the fitting unit 903 and the exporting unit 904 in the apparatus 900 for exporting a driving property index of an autonomous vehicle and technical effects brought by them can refer to related descriptions of steps 201, 202, 203 and 204 in the corresponding embodiment in FIG. 2 respectively, and will not be repeated here.

In some optional implementations of the present embodiment, the driving property index may include, but not limited to, at least one of the following: a steering driving property index, an acceleration driving property index, or a deceleration driving property index.

In some optional implementations of the present embodiment, the driving property index may include a steering driving property index, the driving scenario may include changing a steering angle of the autonomous vehicle from a first steering angle value to a second steering angle value, and the driving state information set includes driving state information of the autonomous vehicle collected at intervals of every preset steering angle value under the driving scenario.

In some optional implementations of the present embodiment, the fitting unit 903 can be further configured for: for each piece of driving state information in the driving state information set, generating a coordinate corresponding to the driving state information by taking a steering angle value corresponding to the driving state information as a first coordinate value and taking the driving state information as a second coordinate value; and fitting, through a curve fitting method, a driving curve by using the points indicated by the coordinates corresponding to each piece of driving state information in the driving state information set.

In some optional implementations of the present embodiment, the driving curve may include, but not limited to, at least one of the following: a steering time curve, a steering angular velocity curve, or a torque curve; and the steering driving property index includes at least one of the following: a steering response time delay, a steering duration, a steering overshoot, a steering overshoot time, an average angular velocity, a maximum angular velocity, or a maximum torque.

In some optional implementations of the present embodiment, the driving property index may include an acceleration driving property index, the driving scenario may include changing an accelerator pedal opening of the autonomous vehicle from a first accelerator pedal opening value to a second accelerator pedal opening value, and the driving state information set includes driving state information of the autonomous vehicle collected at intervals of every preset accelerator pedal opening value under the driving scenario.

In some optional implementations of the present embodiment, the fitting unit 903 can be further configured for: for each piece of driving state information in the driving state information set, generating a coordinate corresponding to the driving state information by taking an accelerator pedal opening value corresponding to the driving state information as a first coordinate value and taking the driving state information as a second coordinate value; and fitting, through a curve fitting method, a driving curve by using the points indicated by the coordinates corresponding to each piece of driving state information in the driving state information set.

In some optional implementations of the present embodiment, the driving curve may include, but not limited to, at least one of the following: an acceleration time curve, an acceleration distance curve, a velocity curve, or an acceleration curve; and the acceleration driving property index includes at least one of the following: an accelerator pedal response time delay, an acceleration response time delay, an acceleration duration, an average velocity, an average acceleration, a maximum velocity, or a maximum acceleration.

In some optional implementations of the present embodiment, the driving property index may include a deceleration driving property index, the driving scenario may include changing a brake pedal opening of the autonomous vehicle from a first brake pedal opening value to a second brake pedal opening value, and the driving state information set includes driving state information of the autonomous vehicle collected at intervals of every preset brake pedal opening value under the driving scenario.

In some optional implementations of the present embodiment, the fitting unit 903 can be further configured for: for each piece of driving state information in the driving state information set, generating a coordinate corresponding to the driving state information by taking a brake pedal opening value corresponding to the driving state information as a first coordinate value and taking the driving state information as a second coordinate value; and fitting, through a curve fitting method, a driving curve by using the points indicated by the coordinates corresponding to each piece of driving state information in the driving state information set.

In some optional implementations of the present embodiment, the driving curve may include, but not limited to, at least one of the following: a deceleration time curve, a deceleration distance curve, a velocity curve, or a deceleration curve; and the deceleration driving property index includes at least one of the following: a brake pedal response time delay, a deceleration response time delay, a deceleration duration, an average velocity, an average deceleration, a maximum velocity, or a maximum deceleration.

Figure 10:
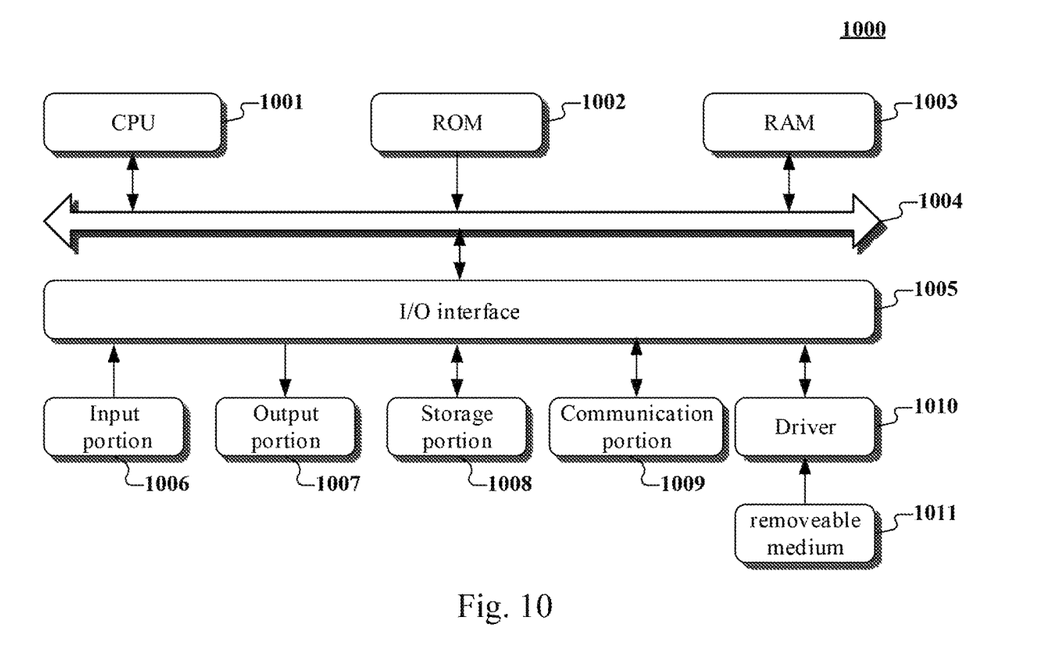
FIG. 10 is a structural diagram of a computer system of a server suitable for implementing the embodiments of the present disclosure.

Referring to FIG. 1, FIG. 10 shows a schematic structural diagram of a computer system 1000 adapted to implement the server of the embodiments of the present disclosure. The server shown in FIG. 10 is merely an example and should impose any limitation on the functions and usage range of the embodiments of the present disclosure.

As shown in FIG. 10, the computer system 1000 includes a central processing unit (CPU) 1001, which may execute various appropriate actions and processes in accordance with a program stored in a read-only memory (ROM) 1002 or a program loaded into a random access memory (RAM) 1003 from a storage portion 1008. The RAM 1003 also stores various programs and data required by operations of the system 1000. The CPU 1001, the ROM 1002 and the RAM 1003 are connected to each other through a bus 1004. An input/export (I/O) interface 1005 is also connected to the bus 1004.

The following components are connected to the I/O interface X05: an input portion 1006 including a keyboard, a mouse etc.; an export portion 1007 comprising a cathode ray tube (CRT), a liquid crystal display device (LCD), a speaker etc.; a storage portion 1008 including a hard disk and the like; and a communication portion 1009 comprising a network interface card, such as a LAN card and a modem. The communication portion 1009 performs communication processes via a network, such as the Internet. A driver 1010 is also connected to the I/O interface 1005 as required. A removable medium 1011, such as a magnetic disk, an optical disk, a magneto-optical disk, and a semiconductor memory, may be installed on the driver 1010, to facilitate the retrieval of a computer program from the removable medium 1011, and the installation thereof on the storage portion 1008 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a constructing unit, an acquiring unit, a fitting unit and an exporting unit, where the names of these units or modules do not in some cases constitute a limitation to such units or modules themselves. For example, the constructing unit may also be described as "a unit for constructing a driving scenario of the autonomous vehicle by using a preset parameter."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: construct a driving scenario of the autonomous vehicle by using a preset driving parameter; acquire a driving state information set of the autonomous vehicle under the driving scenario; fit a driving curve by using the driving state information set; and acquire and exporting the driving property index of the autonomous vehicle by analyzing the driving curve.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for exporting a driving property index of an autonomous vehicle, the method comprising:
constructing a driving scenario of the autonomous vehicle by using a preset driving parameter;
acquiring a driving state information set of the autonomous vehicle under the constructed driving scenario, wherein the driving state information set comprises driving state information of the autonomous vehicle under the constructed driving scenario collected by sensors;
fitting, through a curve fitting method, a driving curve by using the acquired driving state information set of the autonomous vehicle under the constructed driving scenario; and
analyzing the fitted driving curve, to acquire the driving property index of the autonomous vehicle from the fitted driving curve, and exporting the acquired driving property index of the autonomous vehicle, wherein the driving property index comprises at least one of a steering driving property index, an acceleration driving property index, or a deceleration driving property index,
in response to the driving property index comprising the steering driving property index, the driving scenario comprises a scenario with a steering angle of the autonomous vehicle changing from a first steering angle value to a second steering angle value, and the driving state information set comprises driving state information of the autonomous vehicle collected at intervals of every preset steering angle value under the driving scenario, wherein the fitting the driving curve by using the driving state information set comprises:
for each piece of driving state information in the driving state information set, generating a coordinate corresponding to the driving state information by taking a steering angle value corresponding to the driving state information as a first coordinate value and taking the driving state information as a second coordinate value; and
fitting the driving curve by using points indicated by coordinates corresponding to each piece of driving state information in the driving state information set,
wherein the driving curve comprises at least one of a steering time curve, a steering angular velocity curve, or a torque curve; and the steering driving property index comprises at least one of a steering response time delay, a steering duration, a steering overshoot, a steering overshoot time, an average angular velocity, a maximum angular velocity, or a maximum torque.

2. The method according to claim 1, wherein the driving property index comprises the acceleration driving property index, the driving scenario comprises a scenario with an accelerator pedal opening of the autonomous vehicle changing from a first accelerator pedal opening value to a second accelerator pedal opening value, and the driving state information set comprises driving state information of the autonomous vehicle collected at intervals of every preset accelerator pedal opening value under the driving scenario.

3. The method according to claim 2, wherein the fitting a driving curve by using the driving state information set comprises:
for each piece of driving state information in the driving state information set, generating a coordinate corresponding to the driving state information by taking an accelerator pedal opening value corresponding to the driving state information as a first coordinate value and taking the driving state information as a second coordinate value; and
fitting a driving curve by using points indicated by coordinates corresponding to each piece of driving state information in the driving state information set.

4. The method according to claim 3, wherein the driving curve comprises at least one of an acceleration time curve, an acceleration distance curve, a velocity curve, or an acceleration curve; and the acceleration driving property index comprises at least one of an accelerator pedal response time delay, an acceleration response time delay, an acceleration duration, an average velocity, an average acceleration, a maximum velocity, or a maximum acceleration.

5. The method according to claim 1, wherein the driving property index comprises the deceleration driving property index, the driving scenario comprises a scenario with a brake pedal opening of the autonomous vehicle changing from a first brake pedal opening value to a second brake pedal opening value, and the driving state information set comprises driving state information of the autonomous vehicle collected at intervals of every preset brake pedal opening value under the driving scenario.

6. The method according to claim 5, wherein the fitting a driving curve by using the driving state information set comprises:
for each piece of driving state information in the driving state information set, generating a coordinate corresponding to the driving state information by taking a brake pedal opening value corresponding to the driving state information as a first coordinate value and taking the driving state information as a second coordinate value; and
fitting a driving curve by using points indicated by coordinates corresponding to each piece of driving state information in the driving state information set.

7. The method according to claim 6, wherein the driving curve comprises at least one of a deceleration time curve, a deceleration distance curve, a velocity curve, or a deceleration curve; and the deceleration driving property index comprises at least one of a brake pedal response time delay, a deceleration response time delay, a deceleration duration, an average velocity, an average deceleration, a maximum velocity, or a maximum deceleration.

8. The method according to claim 1, wherein the driving state information set comprises driving state information of the autonomous vehicle under the constructed driving scenario collected by sensors installed on the autonomous vehicle.

9. An apparatus for exporting a driving property index of an autonomous vehicle, the apparatus comprising:
at least one processor; and
a memory storing instructions, the instructions when executed by the at least one processor, cause the at least one processor to perform operations, the operations comprising:
constructing a driving scenario of the autonomous vehicle by using a preset driving parameter;
acquiring a driving state information set of the autonomous vehicle under the constructed driving scenario, wherein the driving state information set comprises driving state information of the autonomous vehicle under the constructed driving scenario collected by sensors;

fitting, through a curve fitting method, a driving curve by using the acquired driving state information set of the autonomous vehicle under the constructed driving scenario; and analyzing the fitted driving curve, to acquire the driving property index of the autonomous vehicle from the fitted driving curve, and exporting the acquired driving property index of the autonomous vehicle, wherein the driving property index comprises at least one of a steering driving property index, an acceleration driving property index, or a deceleration driving property index, in response to the driving property index comprising the steering driving property index, the driving scenario comprises a scenario with a steering angle of the autonomous vehicle changing from a first steering angle value to a second steering angle value, and the driving state information set comprises driving state information of the autonomous vehicle collected at intervals of every preset steering angle value under the driving scenario, wherein the fitting the driving curve by using the driving state information set comprises:

for each piece of driving state information in the driving state information set, generating a coordinate corresponding to the driving state information by taking a steering angle value corresponding to the driving state information as a first coordinate value and taking the driving state information as a second coordinate value; and fitting the driving curve by using points indicated by coordinates corresponding to each piece of driving state information in the driving state information set, wherein the driving curve comprises at least one of a steering time curve, a steering angular velocity curve, or a torque curve; and the steering driving property index comprises at least one of a steering response time delay, a steering duration, a steering overshoot, a steering overshoot time, an average angular velocity, a maximum angular velocity, or a maximum torque.

10. A non-transitory computer readable storage medium storing a computer program, wherein the computer program, when executed by a processor, cause the processor to perform operations, the operation comprising:

constructing a driving scenario of the autonomous vehicle by using a preset driving parameter;

acquiring a driving state information set of the autonomous vehicle under the constructed driving scenario, wherein the driving state information set comprises driving state information of the autonomous vehicle under the constructed driving scenario collected by sensors;

fitting, through a curve fitting method, a driving curve by using the acquired driving state information set of the autonomous vehicle under the constructed driving scenario; and analyzing the fitted driving curve, to acquire the driving property index of the autonomous vehicle from the fitted driving curve, and exporting the acquired driving property index of the autonomous vehicle, wherein the driving property index comprises at least one of a steering driving property index, an acceleration driving property index, or a deceleration driving property index, in response to the driving property index comprising the steering driving property index, the driving scenario comprises a scenario with a steering angle of the autonomous vehicle changing from a first steering angle value to a second steering angle value, and the driving state information set comprises driving state information of the autonomous vehicle collected at intervals of every preset steering angle value under the driving scenario, wherein the fitting the driving curve by using the driving state information set comprises:

for each piece of driving state information in the driving state information set, generating a coordinate corresponding to the driving state information by taking a steering angle value corresponding to the driving state information as a first coordinate value and taking the driving state information as a second coordinate value; and fitting the driving curve by using points indicated by coordinates corresponding to each piece of driving state information in the driving state information set, wherein the driving curve comprises at least one of a steering time curve, a steering angular velocity curve, or a torque curve; and the steering driving property index comprises at least one of a steering response time delay, a steering duration, a steering overshoot, a steering overshoot time, an average angular velocity, a maximum angular velocity, or a maximum torque.

* * * * *